United States Patent
Haruyama et al.

(10) Patent No.: US 12,486,975 B2
(45) Date of Patent: Dec. 2, 2025

(54) LENS STRUCTURE AND LIGHT SOURCE DEVICE HAVING LENS WITH HALF-MIRROR, AND LIGHT RECEIVER

(71) Applicant: ALPS ALPINE CO., LTD., Tokyo (JP)

(72) Inventors: Hiroteru Haruyama, Niigata (JP); Junya Ogata, Niigata (JP); Hironori Namba, Niigata (JP)

(73) Assignee: ALPS ALPINE CO., LTD., Tokyo (JP)

( * ) Notice: Subject to any disclaimer, the term of this patent is extended or adjusted under 35 U.S.C. 154(b) by 30 days.

(21) Appl. No.: 18/602,561

(22) Filed: Mar. 12, 2024

(65) Prior Publication Data
US 2024/0219014 A1   Jul. 4, 2024

Related U.S. Application Data

(63) Continuation of application No. PCT/JP2022/033726, filed on Sep. 8, 2022.

(30) Foreign Application Priority Data

Oct. 13, 2021   (JP) .................................. 2021-167805

(51) Int. Cl.
F21V 5/04    (2006.01)
F21V 7/05    (2006.01)
F21V 23/04   (2006.01)

(52) U.S. Cl.
CPC ............ F21V 23/0457 (2013.01); F21V 5/04 (2013.01); F21V 7/05 (2013.01)

(58) Field of Classification Search
CPC ........ F21V 5/04; F21V 23/0457; F21V 5/048; F21V 23/0442; F21K 9/68; F21K 9/69;

(Continued)

(56) References Cited

U.S. PATENT DOCUMENTS 3,628,027 A * 12/1971 Brauss ................. G02B 27/144
                                            359/664
3,915,575 A * 10/1975 Sick ..................... G01N 21/534
                                            356/138

(Continued)

FOREIGN PATENT DOCUMENTS

JP    H01-133101 U    9/1989
JP    H09-080274      3/1997

(Continued)

OTHER PUBLICATIONS

International Search Report for PCT/JP2022/033726 mailed on Nov. 29, 2022.

(Continued)

*Primary Examiner* — Ismael Negron
(74) *Attorney, Agent, or Firm* — IPUSA, PLLC

(57) ABSTRACT

A light source device includes a light source; a light receiver; a lens disposed on a light-emitting side of the light source; a lens barrel configured to retain the lens; and a half mirror attached to the lens barrel and disposed to face the lens. The lens includes a first lens surface facing the light source and a second lens surface facing the half mirror. The first lens surface includes a first portion configured to receive light from the light source and direct it to the half-mirror through the second lens surface, and a light-focusing portion provided in a region of the first lens surface outside the first portion, such light-focusing portion configured to focus light that is reflected by the half mirror towards the second lens surface and retransmitted through the lens, towards the light receiver.

8 Claims, 9 Drawing Sheets

(58) Field of Classification Search
CPC ........ H10F 55/15; H10F 55/155; H10F 55/25; H10F 55/255
See application file for complete search history.

(56) References Cited

U.S. PATENT DOCUMENTS

| | | | | |
|---|---|---|---|---|
| 5,546,212 | A * | 8/1996 | Kunikane | G02B 6/4246 385/47 |
| 5,555,334 | A * | 9/1996 | Ohnishi | H04B 10/40 385/33 |
| 5,856,994 | A * | 1/1999 | Hayakawa | H01S 3/09415 372/75 |
| 5,953,145 | A * | 9/1999 | Koyama | G02B 6/4246 257/E31.127 |
| 5,997,185 | A * | 12/1999 | Kropp | G02B 6/4214 385/89 |
| 6,243,508 | B1 | 6/2001 | Jewell et al. | |
| 6,898,219 | B2 * | 5/2005 | Malone | G02B 6/4286 372/101 |
| 6,948,865 | B2 * | 9/2005 | Kuhara | G02B 6/4204 385/94 |
| 7,128,477 | B2 * | 10/2006 | Tabata | G02B 6/4206 385/37 |
| 7,160,034 | B2 * | 1/2007 | Nishie | G02B 6/4246 385/94 |
| 7,165,896 | B2 * | 1/2007 | Hauffe | G02B 6/4201 257/E33.071 |
| 9,360,642 | B2 * | 6/2016 | Morioka | G02B 6/4214 |
| 2001/0042846 | A1 | 11/2001 | Togashi | |
| 2008/0317076 | A1 | 12/2008 | Komiyama | |
| 2016/0313520 | A1 | 10/2016 | Shinohara et al. | |
| 2019/0319424 | A1 | 10/2019 | Kihara | |

FOREIGN PATENT DOCUMENTS

| | | |
|---|---|---|
| JP | H10-312566 | 11/1998 |
| JP | H10-321900 | 12/1998 |
| JP | 3089200 | 9/2000 |
| JP | 2001-273661 | 10/2001 |
| JP | 2002-319699 | 10/2002 |
| JP | 2003-132580 | 5/2003 |
| JP | 2005-274678 | 10/2005 |
| JP | 2009-004525 | 1/2009 |
| JP | 2009-282222 | 12/2009 |
| JP | 2019-186554 | 10/2019 |
| KR | 10-2018-0111084 | 10/2018 |
| WO | 2015/088032 | 6/2015 |

OTHER PUBLICATIONS

Korean Office Action for 10-2022-7041337 mailed on Oct. 10, 2024.

* cited by examiner

LENS STRUCTURE AND LIGHT SOURCE DEVICE HAVING LENS WITH HALF-MIRROR, AND LIGHT RECEIVER

CROSS-REFERENCE TO RELATED APPLICATIONS

This application is a continuation application of International Application No. PCT/JP2022/033726 filed on Sep. 8, 2022, and designated the U.S., which is based upon and claims priority to Japanese Patent Application No. 2021-167805, filed on Oct. 13, 2021, the entire contents of which are incorporated herein by reference.

BACKGROUND

1. Field of the Invention

The present disclosure relates to lens barrel-equipped lenses and light source devices.

2. Description of the Related Art

Japanese Patent Publication No. 2003-132580 discloses a multi-beam light source unit including: a semiconductor laser having a plurality of light-emitting points; a collimate lens that forms a plurality of outgoing light beams emitted from the semiconductor laser into parallel light; a half mirror having a semi-transmissive surface that reflects the plurality of outgoing light beams at a predetermined reflectance; and a light-receiving element having a plurality of light-receiving surfaces that independently receive the plurality of light beams.

Japanese Patent Publication No. 2005-274678 discloses an optical scanner sequentially including: a monitor-equipped light source; a collimate lens; a half mirror; a polygon mirror front lens; a polygon mirror; a polygon mirror rear lens; and a photoconductor. The monitor-equipped light source includes, on the same substrate: a VCSEL light source portion where numerous light-emitting points are arranged in a line; and a single optical sensor that receives a plurality of laser beams emitted from the plurality of light-emitting points.

Japanese Patent Publication No. 2002-319699 discloses an optical device including: a light source that emits laser light; a lens that transmits through the laser light emitted from the light source; and a light-receiving element that receives a part of the laser light emitted from the light source. In this optical device, the lens includes a lens body through which the laser light transmits and a reflective portion that is provided on the outer periphery of the lens body and reflects a part of the laser light, and the light-receiving element receives the laser light emitted from the light source and reflected by the reflective portion.

Japanese Patent Publication No. 1998-321900 discloses an optical module that monitors light intensity without sacrificing emitted light. In this optical module, a light-emitting element and a light-receiving element mounted in a lead frame are integrally sealed with a resin that is transparent with respect to wavelengths of emitted light of the light-emitting element. A resin-molded portion includes: a light-focusing lens aligned to the light-emitting element in terms of an optical axis; and a reflective surface that is provided at a position on the periphery of the light-focusing lens and off the optical axis and that reflects unnecessary leak light of the emitted light toward the light-receiving element. The light-focusing lens and the reflective surface are simultaneously formed by a mold upon sealing with the resin.

Japanese Patent No. 3089200 discloses a light pickup device that is reduced in the number of parts and compact, lightweight, and inexpensive by utilizing characteristics of a hologram laser and guiding primary diffracted light to a light-receiving element for controlling laser output.

Japanese Utility Model Publication No. 1989-133101 discloses an imaging element including a housing that houses: a roof mirror array in which a plurality of reflective surfaces in a V shape are formed in a zigzag manner; and a lens array in which a plurality of lenses are formed to be positioned on a front surface of this roof mirror array. The housing is provided with an optical path separating mirror including a reflective portion and a light-transmissive portion that face the front surface of the lens array, and a light-transmission window that faces the reflective portion. In this imaging element, a light-transmissive layer is formed at a portion other than an effective imaging light beam-transmitting area of the optical path separating mirror.

SUMMARY

One aspect of the present disclosure relates to a lens barrel-equipped lens including: a lens disposed on a light-emitting side of a light source; a lens barrel configured to retain the lens; and a half mirror attached to the lens barrel and disposed to face the lens that is between the half mirror and the light source. The lens includes a first lens surface facing the light source and a second lens surface facing the half mirror. A light-focusing portion is provided in a region of the first lens surface outward of an effective range of the first lens surface where light of the light source transmits. The light-focusing portion is configured to focus light that is reflected by the half mirror and re-transmits through the lens, toward the light source.

According to this configuration, when a part of the light emitted from the light source and transmitting through the lens is reflected by the half mirror and re-transmits through the lens, it is possible to effectively focus the light in the light-focusing portion provided in the region of the first lens surface outward of the effective range of the first lens surface of the lens facing the light source.

In the lens barrel-equipped lens, the light-focusing portion may include a first refraction portion configured to refract the light reflected by the half mirror and re-transmitting through the lens, in a direction away from an optical axis of the lens, and the first refraction portion may include a tapered surface or a recessed surface. Thereby, it is possible to refract the light re-transmitting through the lens, in the direction away from the optical axis of the lens by the tapered surface or the recessed surface included in the first refraction portion.

In the lens barrel-equipped lens, the first refraction portion may include two or more surfaces selected from the group consisting of the tapered surface and the recessed surface, and the two or more surfaces may be disposed side by side in the direction away from the optical axis of the lens. Thereby, it is possible to further focus the light by the two or more surfaces selected from the group consisting of the tapered surface and the recessed surface included in the first refraction portion. Specific examples in which the first refraction portion includes two surfaces selected from the group consisting of the tapered surface and the recessed surface include a case in which the first refraction portion includes two tapered surfaces, a case in which the first refraction portion includes two recessed surfaces, and a case in which the first refraction portion includes the tapered surface and the recessed surface.

In the lens barrel-equipped lens, preferably, the first refraction portion includes a plurality of tapered surfaces disposed side by side in the direction away from the optical axis of the lens, and the tapered surfaces that are closer to the optical axis have a greater angle with respect to an orthogonal axis that is orthogonal to the optical axis. Thereby, it is possible to further focus the light because, of the plurality of tapered surfaces included in the first refraction portion, the tapered surface closer to the optical axis refracts the light in a direction further away from the optical axis.

In the lens barrel-equipped lens, a second refraction portion configured to refract the light reflected by the half mirror may be provided in a region of the second lens surface outward of an effective range of the second lens surface where light of the light source transmits. Thereby, when the light reflected by the half mirror re-transmits through the lens, that light is refracted by the second refraction portion and can efficiently re-transmit through the lens.

In the lens barrel-equipped lens, as viewed in a direction along the optical axis, the second refraction portion may overlap at least a part of the first refraction portion. Thereby, it is possible to refract the light by the second refraction portion, and efficiently send, to the first refraction portion, light of a component that travels straight in parallel to the optical axis of the lens.

Another aspect of the present disclosure relates to a light source device including: a light source; a light receiver juxtaposed with the light source; and the lens barrel-equipped lens. The light emitted from the light source is divided into: light that transmits through the half mirror of the lens barrel-equipped lens; and light that is reflected by the half mirror. The light reflected by the half mirror re-transmits through the lens and is focused by the light-focusing portion toward the light receiver. With this configuration, it is possible to focus the light reflected by the half mirror and re-transmitting through the lens toward the light receiver, and increase the quantity of the light received by the light receiver.

In the light source device, the light traveling from the light-focusing portion toward the light receiver may include a focal point between the light-focusing portion and the light receiver. Thereby, it is possible to receive the light reflected by the half mirror and re-transmitted through the lens in a broad range of the light receiver.

DESCRIPTION OF THE EMBODIMENTS

When monitoring the quantity of light emitted from a light source, a part of the light emitted from the light source is reflected by a half mirror at an angle of θ and caused to re-transmit through the lens, and that light is focused by a projecting surface of the lens facing the light source and received by a light-receiving element. The projecting surface facing the light source is a surface appropriately adjusted to form incident laser light beams into collimate light, and is not intended to appropriately focus re-incident laser light beams to a predetermined position for monitoring. That is, the lens focuses the light tilted from the optical axis at an angle of θ (re-incident light). As a result, the quantity of light reaching the light-receiving element becomes lower. This necessitates an increase in sensitivity of the light-receiving element and an increase in area of the light-receiving surface, which can cause an increase in size of the device and increase cost.

The present disclosure has been accomplished in view of the above-described issues. It is an object to provide a lens barrel-equipped lens and a light source device that can increase the quantity of light received by the light-receiving element in a configuration in which a part of light emitted from a light source is reflected by a half mirror and received by a light-receiving element.

Hereinafter, embodiments of the present disclosure will be described in detail with reference to the accompanying drawings. In the following description, the same members are denoted by the same symbols, and duplicate description of the members described once will be omitted appropriately.

(Configurations of Lens Barrel-Equipped Lens and Light Source Device)

Figure 1:
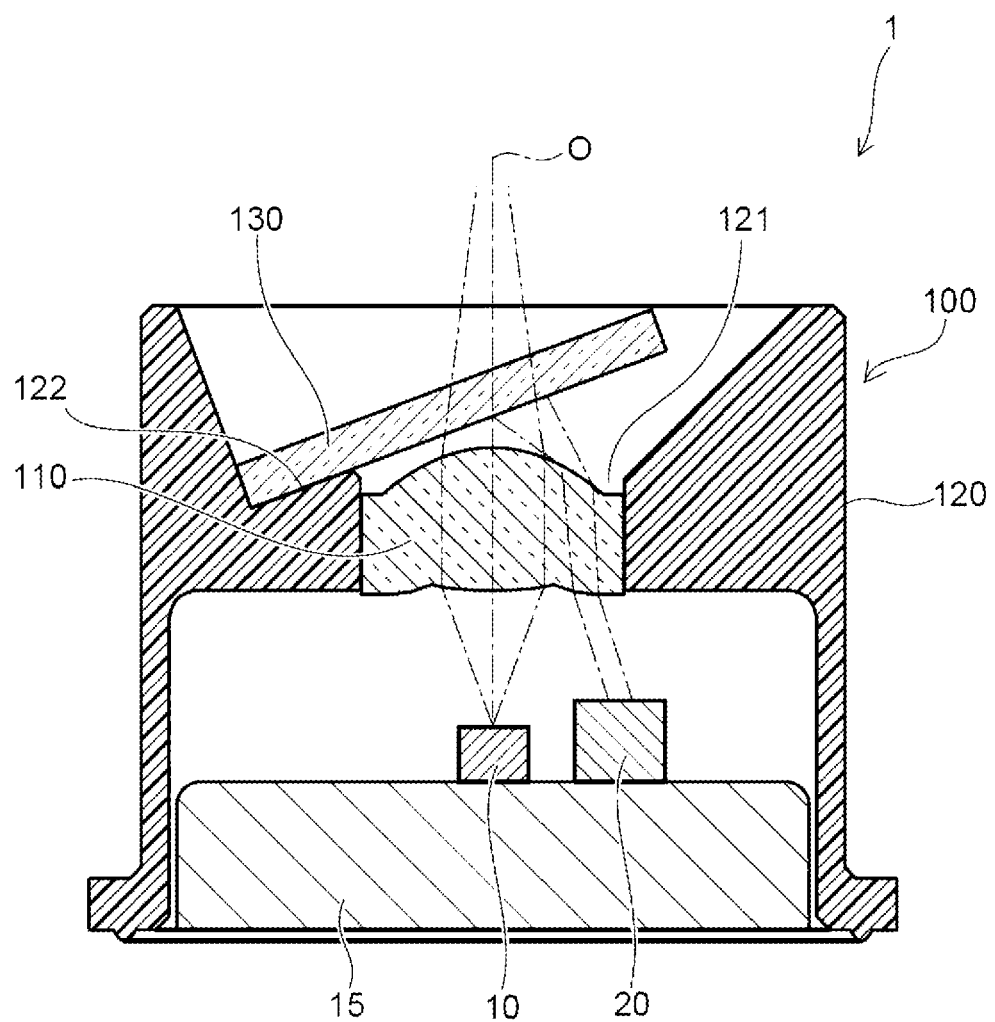
FIG. 1 is a cross-sectional view illustrating an example of a configuration of a light source device according to the present embodiment.
Figure 1:
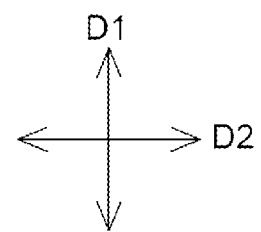

FIG. 1 is a cross-sectional view illustrating an example of the configuration of the light source device according to the present embodiment. As illustrated in FIG. 1, a light source device 1 according to the present embodiment includes a light source 10, a light receiver 20, and a lens barrel-equipped lens 100. As the light source 10, for example, a single- or multi-beam, plane-emitting laser is used. The light source 10 emits divergent laser light beams in response to a current applied from an unillustrated driving device. The light source 10 is mounted on a substrate 15 and emits laser light (hereinafter referred to simply as "light") toward a side opposite to where the substrate 15 is. In the present embodiment, a direction along an optical axis O of the light source 10 is referred to as a first direction D1, and a direction orthogonal to the optical axis O is referred to as a second direction D2.

The light receiver 20 is mounted on the substrate 15 and juxtaposed with the light source 10. For example, a photodiode is used as the light-receiving element in the light receiver 20. The light receiver 20 receives a part of light emitted from the light source 10 and monitors an output of the light source 10. The light receiver 20 transfers a signal to an unillustrated controller, the signal being obtained by converting a light-receiving state. Based on the signal obtained by receiving the light by the light receiver 20, the light source device 1 is controlled by the controller configured to control the driving device in terms of the intensity of light emitted from the light source 10.

The lens barrel-equipped lens 100 includes a lens 110, a lens barrel 120, and a half mirror 130. The lens barrel 120 is integrated with the lens 110 and the half mirror 130 while retaining the lens 110 and the half mirror 130. The lens barrel 120 situates and retains the lens 110 on the light-emitting side of the light source 10, and situates and retains the half mirror 130 on the opposite side to the light source 10 with respect to the lens 110.

The lens 110 is disposed along the optical axis O to have a predetermined distance from the light source 10 in the first direction D1. The lens 110 focuses the light emitted from the light source 10, toward a target object. The shape of the lens 110 is symmetrical with respect to the center axis (optical axis O) (see FIG. 2). The lens 110 is, for example, a glass lens formed of glass. Details of the lens 110 applied in the present embodiment will be described below.

The lens barrel 120 is positioned, for example, based on a standard that is a standard point provided in the substrate 15. A hole 121 in which the lens 110 is disposed is provided in the center portion of the lens barrel 120, and the lens 110 is set in this hole 121. For example, the lens 110 is fixed to the lens barrel 120 with an adhesive that is cured with ultraviolet rays. By positioning and attaching this lens barrel 120 to the substrate 15, it is possible to dispose the lens 110 in conformity to the optical axis O. When the lens 110 is a glass lens, the glass lens may be a part of the outer profile of the lens barrel 120 upon molding. Thereby, the lens 110 may be molded and at the same time integrated with the lens barrel 120.

The half mirror 130 is formed of, for example, a resin material. The half mirror 130 includes a semi-transmissive surface on a surface of the half mirror 130 facing the lens 110. The semi-transmissive surface reflects the light emitted from the lens 110 at a predetermined reflectance. The reflectance of the semi-transmissive surface is a value at which a necessary quantity of light is obtained by the light receiver 20. Generally, the reflectance is determined in accordance with a wavelength of light, an incident angle of light with respect to the half mirror 130, and a refractive index of the resin material forming the half mirror 130. The semi-transmissive surface is, for example, an $SiO_2$ film that is vapor deposited.

The half mirror 130 is disposed to be tilted at a predetermined angle such that the incident angle of light with respect to the semi-transmissive surface is not perpendicular. The lens barrel 120 is provided with a fixing surface 122 that is tilted at a predetermined angle for disposing the half mirror 130 at the predetermined angle. The half mirror 130 is fixed by the fixing surface 122 and thus disposed at the predetermined angle. For example, the half mirror 130 is fixed to the fixing surface 122 with an adhesive that is cured with ultraviolet rays.

(Configuration of Lens)

Figure 2A:
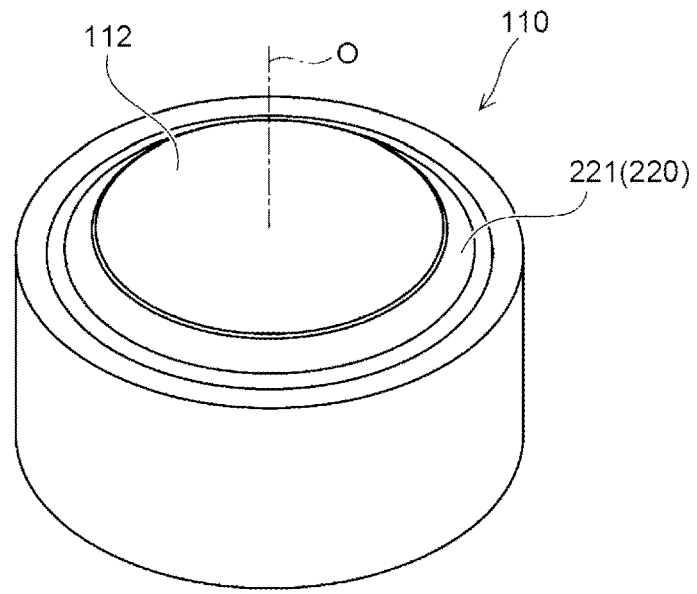
FIG. 2A is a perspective view illustrating an example of a lens applied in the present embodiment.
Figure 2B:
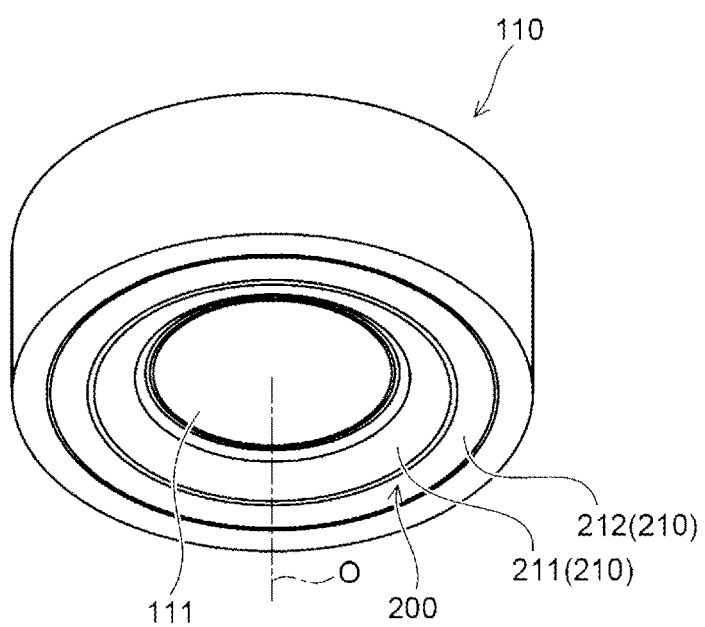
FIG. 2B is a perspective view illustrating the example of the lens applied in the present embodiment.
Figure 3:
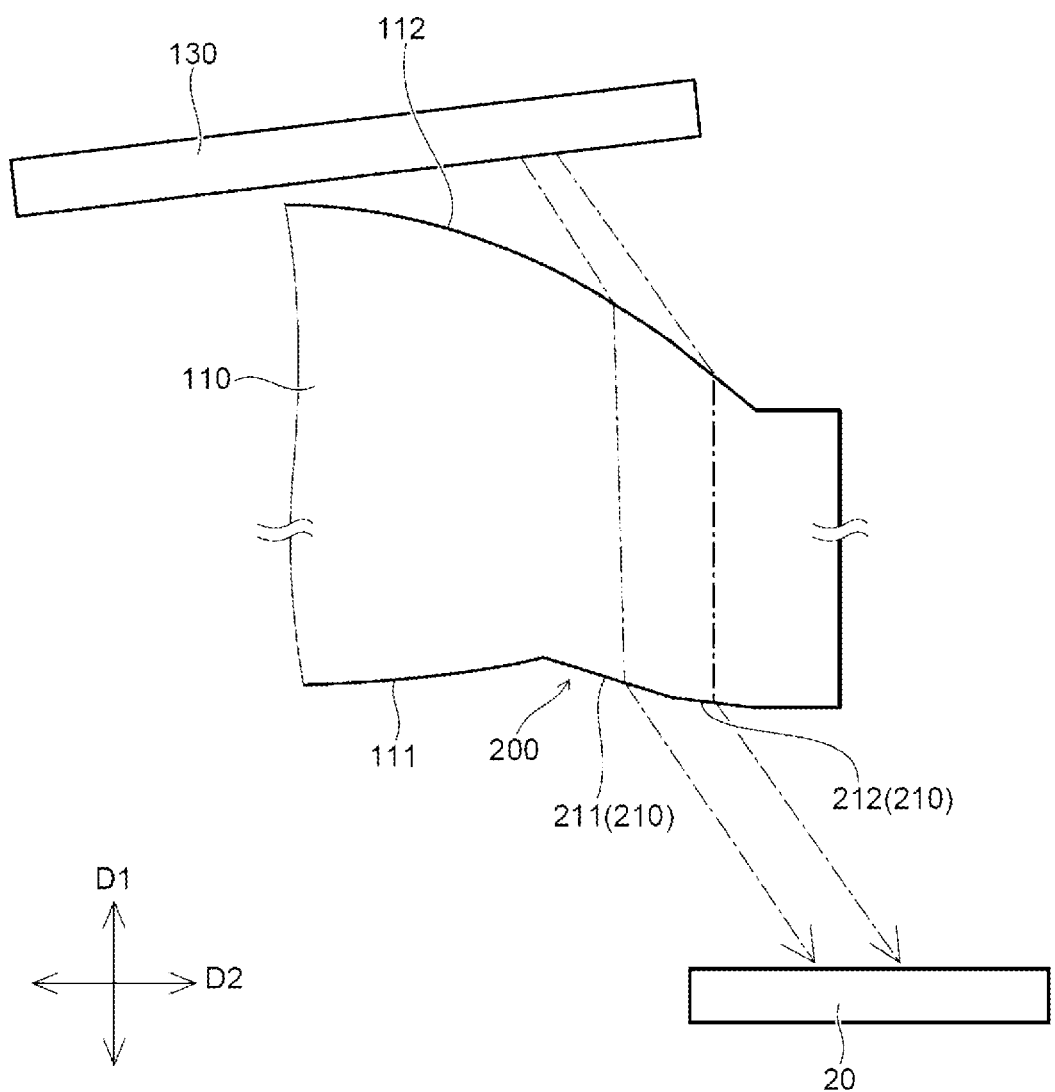
FIG. 3 is a schematic view illustrating an example of a configuration of the lens applied in the present embodiment.

FIG. 2A and FIG. 2B are perspective views illustrating an example of the lens applied in the present embodiment. FIG. 2A is a perspective view of the lens 110 as viewed from above (second lens surface 112 side) and FIG. 2B is a perspective view of the lens 110 as viewed from below (first lens surface 111 side). FIG. 3 is a schematic view illustrating an example of the configuration of the lens applied in the present embodiment. As illustrated in FIG. 2 and FIG. 3, the lens 110 used in the lens barrel-equipped lens 100 according to the present embodiment includes a first lens surface 111 facing the light source 10 and a second lens surface 112 facing the half mirror 130. The effective range of the lens 110 is a range used for focusing the light emitted from the light source 10 toward the target object.

In the lens barrel-equipped lens 100 according to the present embodiment, the light emitted from the light source 10 transmits through the lens 110 and is focused, and a part of the light transmits through the half mirror 130 to reach the target object and the remaining part of the light is reflected by the semi-transmissive surface of the half mirror 130. The light reflected by the half mirror 130 re-transmits through the lens 110 and reaches the light receiver 20. When the light receiver 20 receives the light that reached the light receiver 20 and converts the light to an electrical signal, the quantity of light emitted from the light source 10 is detected.

The lens 110 used in the lens barrel-equipped lens 100 is provided with a light-focusing portion 200 that is in a region outward of the effective range in the first lens surface 111. The light-focusing portion 200 focuses, toward the light receiver 20, the light that is reflected by the half mirror 130 and re-transmits through the lens 110. Thereby, when the light reflected by the half mirror 130 re-transmits through the lens 110, the light is effectively focused by the light-focusing portion 200 provided in a region outward of the effective range in the first lens surface 111 of the lens 110, and the light reaches the light receiver 20.

Specifically, the light-focusing portion 200 includes a first refraction portion 210 in which the light that re-transmitted through the lens 110 is refracted in the direction away from the optical axis O of the lens 110. The first refraction portion 210 preferably includes a plurality of tapered surfaces that are disposed side by side in the second direction D2. The plurality of tapered surfaces in the present embodiment include: a first tapered surface 211 closer to the optical axis O; and a second tapered surface 212 farther from the optical axis O.

Figure 4:
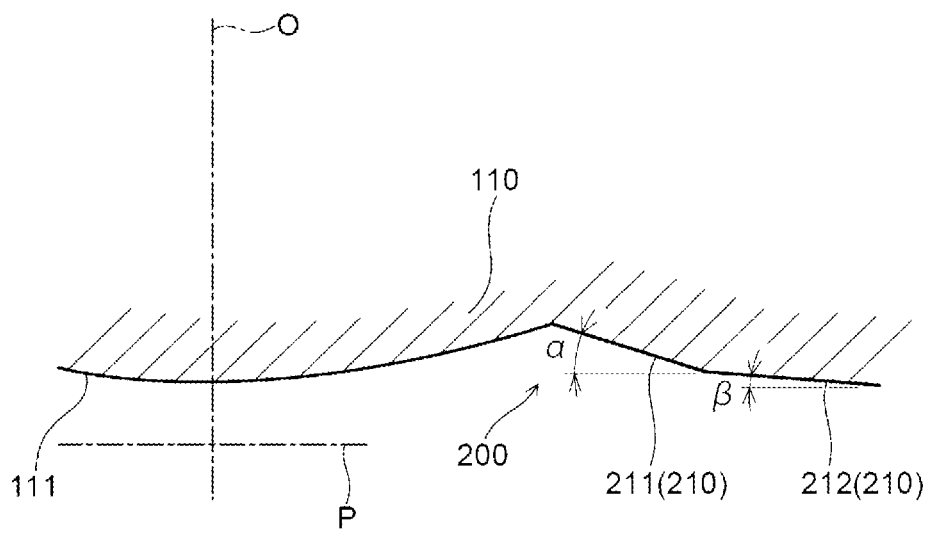
FIG. 4 is a schematic view illustrating an example of angles in a plurality of tapered surfaces.

FIG. 4 is a schematic view illustrating an example of angles in the plurality of tapered surfaces. Of the plurality of tapered surfaces, the tapered surface closer to the optical axis O has a greater angle (taper angle) with respect to an orthogonal axis P that is orthogonal to the optical axis O. For example, a taper angle α of the first tapered surface 211 is greater than a taper angle β of the second tapered surface 212. Thereby, the tapered surface closer to the optical axis O can refract the light in a direction further away from the optical axis. As an example, the taper angles α and β are both 20 degrees (°) or smaller. For example, the taper angle α is 20° and the taper angle β is 5°.

Figure 5:
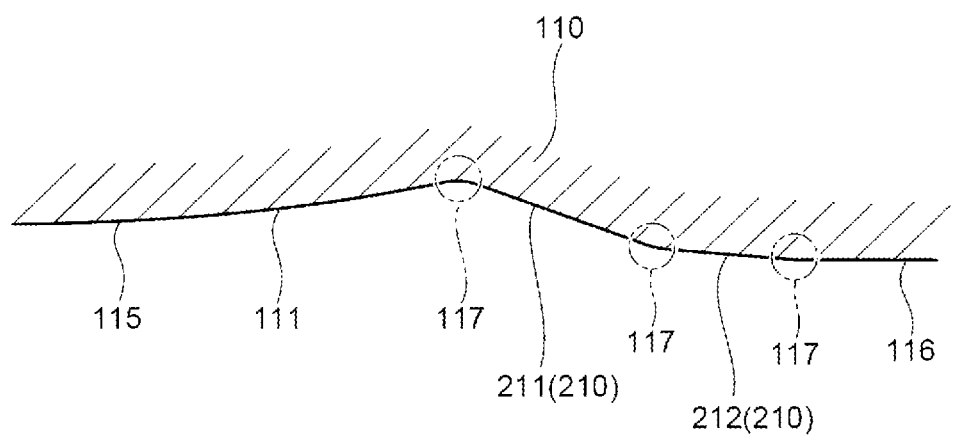
FIG. 5 is a schematic view illustrating an example of seams in a lens surface.

FIG. 5 is a schematic view illustrating an example of seams between functional surfaces of the first lens surface. The first lens surface 111 in the lens 110 is provided with: a lens effective surface 115 that is to be the effective range; the first tapered surface 211 and the second tapered surface 212 that are provided outward of the effective range; and a peripheral surface 116 that is provided outward of the second tapered surface 212.

The lens effective surface 115, the first tapered surface 211, the second tapered surface 212, and the peripheral surface 116 have different curvatures and tilt angles, and a seam 117 between the surfaces next to each other becomes smooth with a curved surface. The curved surface of the seam 117 is preferably 0.1 or lower in terms of R. When the seam 117 is the curved surface, it is possible to suppress diffused reflection at the seam 117 of the light re-transmitting through the lens 110 and efficiently cause the light to reach the light receiver 20.

Figure 6:
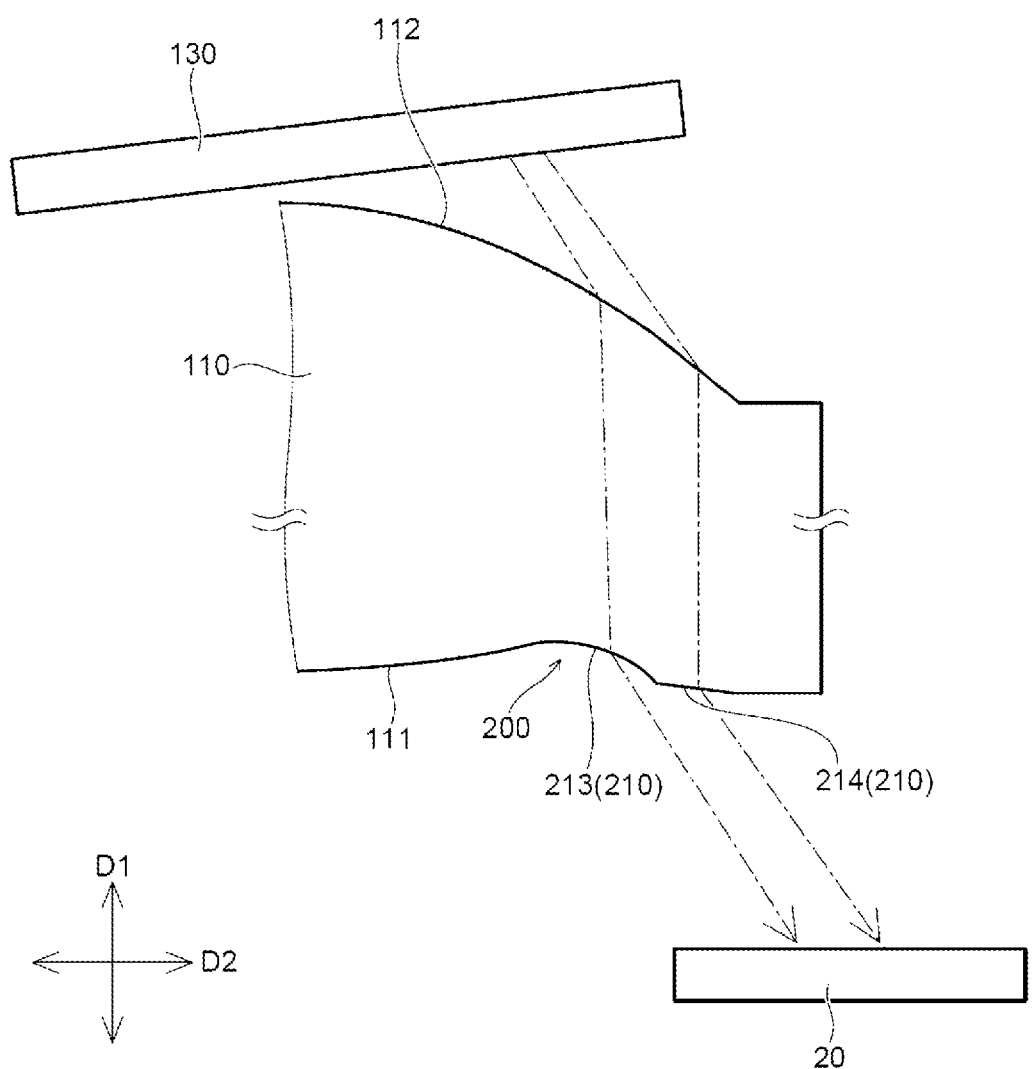
FIG. 6 is a schematic view illustrating an example of a first refraction portion including a recessed surface.

FIG. 6 is a schematic view illustrating an example of the first refraction portion including the recessed surface. As illustrated in FIG. 6, the first refraction portion 210 provided in the first lens surface 111 may include a recessed surface 213. In the example illustrated in FIG. 6, the first refraction portion 210 includes: the recessed surface 213 closer to the optical axis O; and a tapered surface 214 farther from the optical axis O. By virtue of the recessed surface 213 being closer to the optical axis O, it is possible to further effectively focus the light that re-transmitted through the lens 110, toward the light receiver 20. The first refraction portion 210 may include a plurality of recessed surfaces 213 that are arranged in the direction away from the optical axis O.

(Second Lens Surface)

Figure 7:
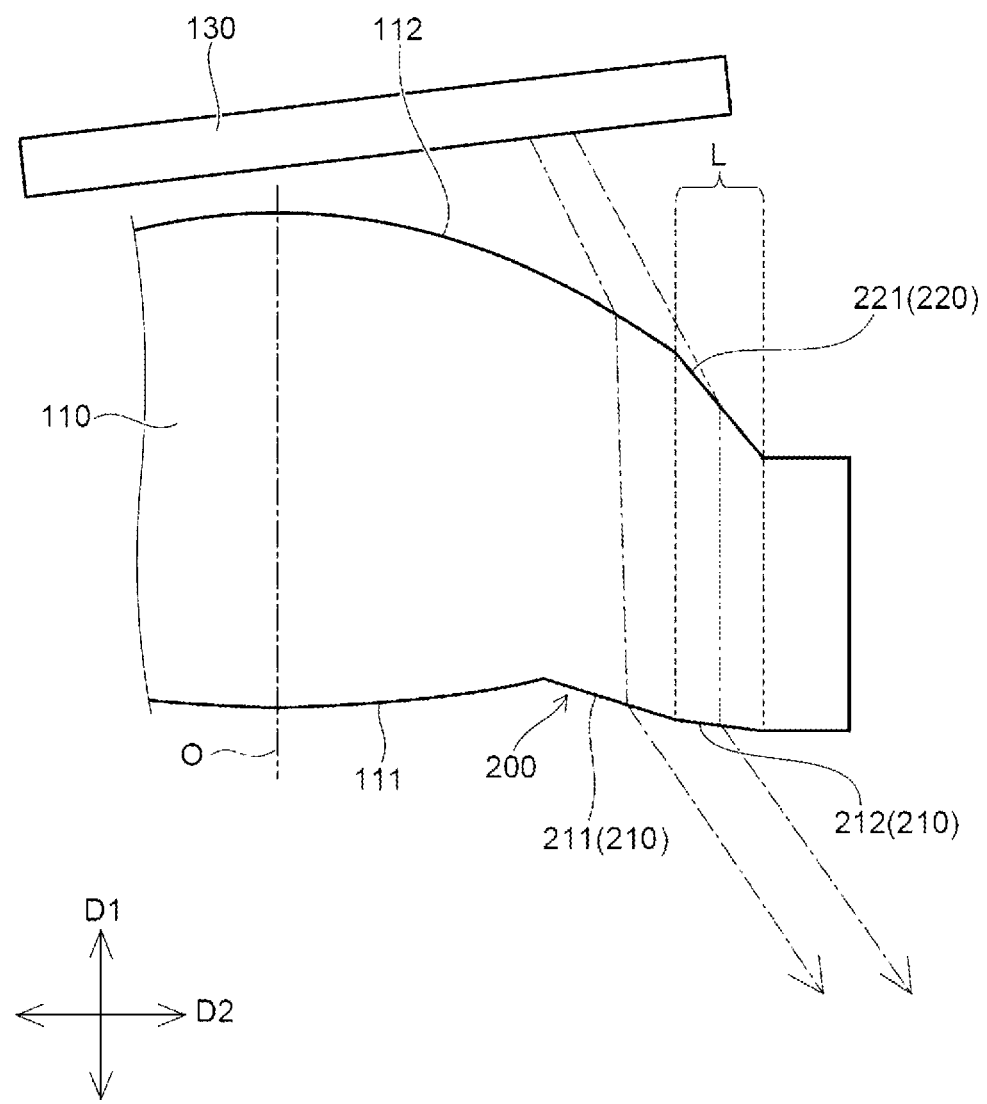
FIG. 7 is a schematic view illustrating an example of a second lens surface.

FIG. 7 is a schematic view illustrating an example of the second lens surface. As illustrated in FIG. 7, the second lens surface 112, which is a surface of the lens 110 facing the half mirror 130, may be provided with a second refraction portion 220. The second refraction portion 220 is provided in a region outward of the effective range in the second lens surface 112 where the light of the light source 10 transmits. The second refraction portion 220 includes a tapered surface 221. By providing the second lens surface 112 with the second refraction portion 220, when the light reflected by the half mirror 130 re-enters the lens 110, it is possible to refract the light by the second refraction portion 220 and cause the light to efficiently re-transmit through the lens 110.

As viewed in the first direction D1, the second refraction portion 220 is preferably provided to overlap at least a part of the first refraction portion 210. In the example illustrated in FIG. 7, as viewed in the first direction D1, the tapered surface 221 of the second refraction portion 220 and the second tapered surface 212 of the first refraction portion 210 are provided to overlap each other (overlapping region L). Thereby, it is possible to refract the light by the second refraction portion 220, and efficiently send, to the first refraction portion 210, light of a component that travels straight in parallel to the optical axis O of the lens 110.

That is, the light reflected by the half mirror 130 is refracted by the second refraction portion 220 provided in the second lens surface 112 of the lens 110. As a result, the light has an increased component in parallel to the optical axis O and re-transmits through the lens 110. Then, the light is refracted by the first refraction portion 210 provided in the first lens surface 111 of the lens 110 and efficiently guided to the light receiver 20. By providing the second refraction portion 220, it is possible to effectively focus the light that cannot sufficiently be focused only by the first refraction portion 210. Also, because the light that re-transmitted through the lens 110 is focused to the light receiver 20 by both of the first refraction portion 210 and the second refraction portion 220, it is possible to increase a degree of freedom in design by causing the refraction portions 210 and 220 to have different optical functions.

(Light Beams from Lens to Light Receiver)

Figure 8:
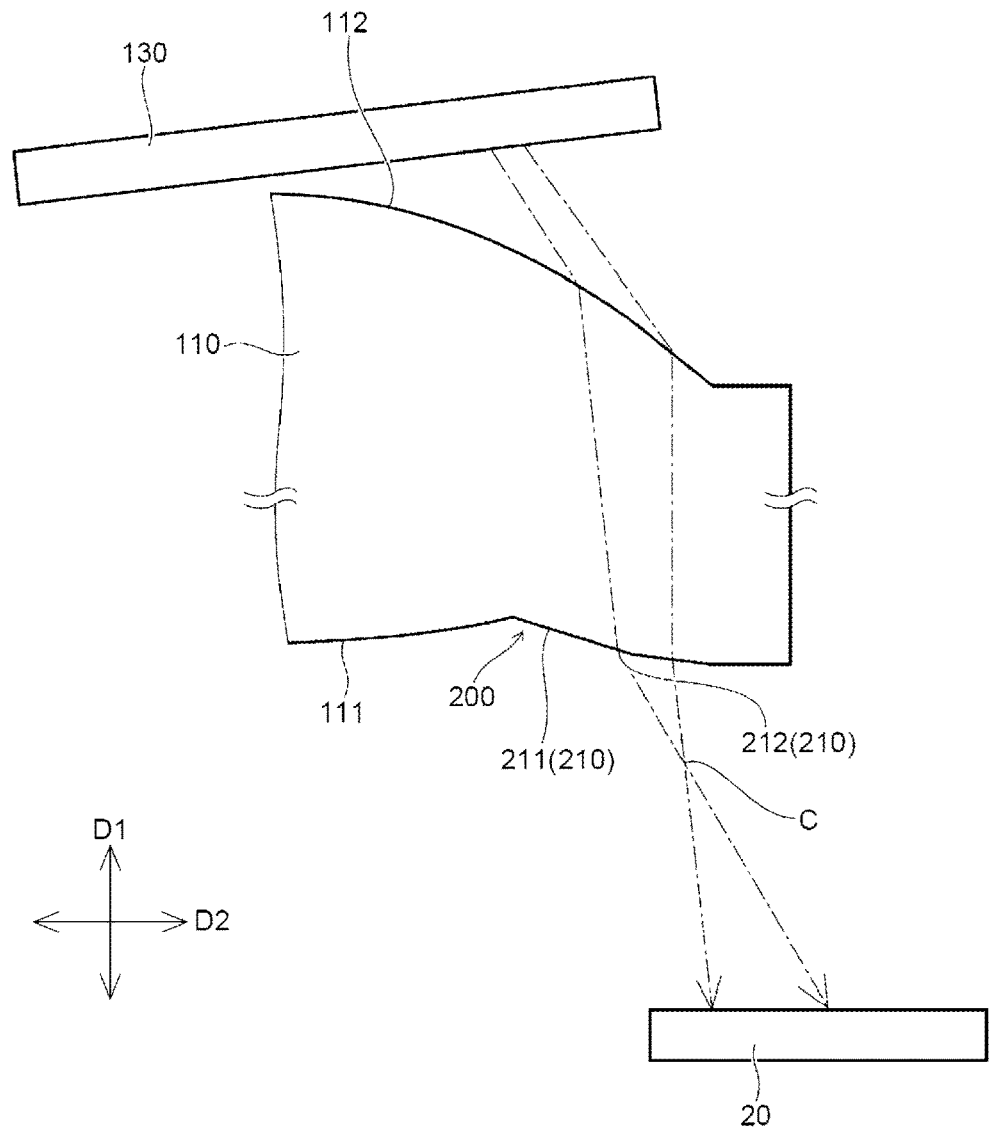
FIG. 8 is a schematic view illustrating an example of light beams from the lens to a light receiver.

FIG. 8 is a schematic view illustrating an example of light beams from the lens to the light receiver. As illustrated in FIG. 8, the light reflected by the half mirror 130 and re-transmitting through the lens 110 is focused by the first refraction portion 210 and the second refraction portion 220 of the light-focusing portion 200. Preferably, the light traveling from the light-focusing portion 200 toward the light receiver 20 has a focal point C between the light-focusing portion 200 and the light receiver 20. Thereby, the light reflected by the half mirror 130 and re-transmitting through the lens 110 is focused by the light-focusing portion 200, and diverged in the course of from the focal point C (i.e., a crossing point) to the light receiver 20. Therefore, it is possible to receive the light in a broad range of the light receiver 20.

(Distribution of Light Received by Light Receiver)

Figure 9A:
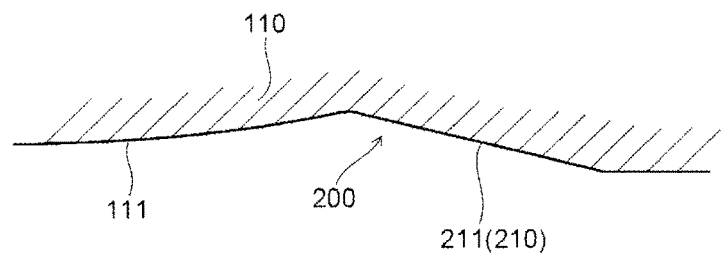
FIG. 9A is a view illustrating an example of a cross section of a lens barrel-equipped lens according to the present embodiment.
Figure 9B:
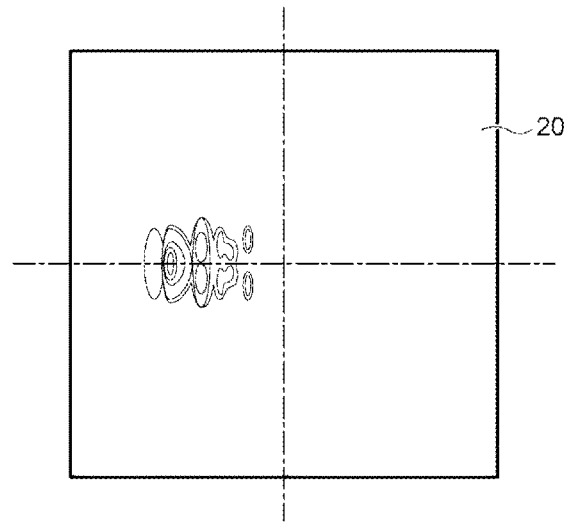
FIG. 9B is a chart illustrating a distribution of light received when the lens of FIG. 9A is used.
Figure 10A:
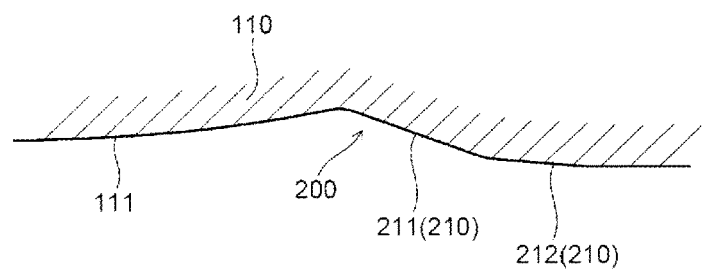
FIG. 10A is a view illustrating another example of the cross section of the lens barrel-equipped lens according to the present embodiment.
Figure 10B:
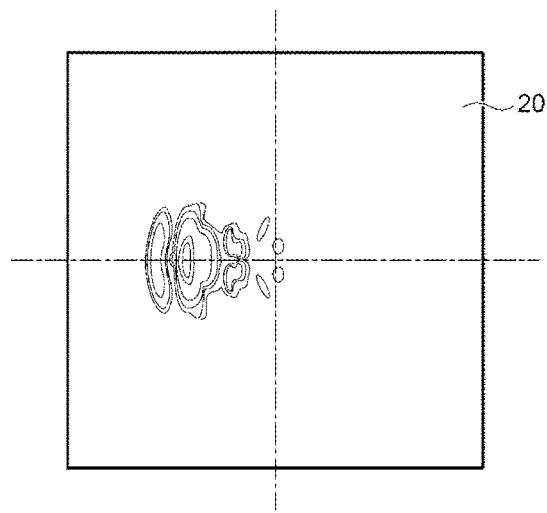
FIG. 10B is a chart illustrating a distribution of light received when the lens of FIG. 10A is used.
Figure 11:
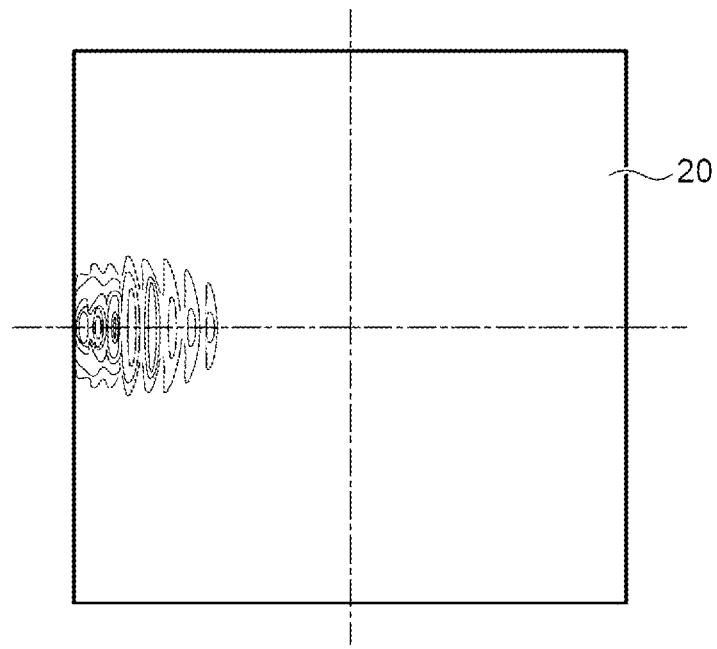
FIG. 11 is a chart illustrating a distribution of light received when a lens barrel-equipped lens according to a comparative example is used.

FIG. 9A is a view illustrating an example of a cross section of the lens barrel-equipped lens according to the present embodiment. FIG. 9B is a chart illustrating a distribution of light received when the lens of FIG. 9A is used. FIG. 10A is a view illustrating another example of the cross section of the lens barrel-equipped lens according to the present embodiment. FIG. 10B is a chart illustrating a distribution of light received when the lens of FIG. 10A is used. FIG. 11 is a chart illustrating a distribution of light received when a lens barrel-equipped lens according to a comparative example is used.

FIG. 9A illustrates an example of the case of using the lens barrel-equipped lens 100 including only the first tapered surface 211, and FIG. 9B illustrates the distribution of light received by the light receiver 20 in this case. FIG. 10A illustrates an example of the case of using the lens barrel-equipped lens 100 including the first tapered surface 211 and the second tapered surface 212, and FIG. 10B illustrates the distribution of light received by the light receiver 20 in this case. The lens barrel-equipped lens according to the comparative example as illustrated in FIG. 11 does not include the light-focusing portion 200.

As illustrated in FIG. 9B, by using the lens barrel-equipped lens 100 including the first tapered surface 211 alone as illustrated in FIG. 9A, it is possible to produce the effect of broadening a light-receiving distribution with respect to the light receiver 20 compared to the lens barrel-equipped lens according to the comparative example as illustrated in FIG. 11 (not including the light-focusing portion 200).

Also, compared to the lens barrel-equipped lens 100 including the first tapered surface 211 alone as illustrated in FIG. 9A, the lens barrel-equipped lens 100 including the first tapered surface 211 and the second tapered surface 212 as illustrated in FIG. 10A has a broad light-receiving distribution, and can receive the light in a broader range of the light receiver 20 (see FIG. 9B and FIG. 10B). That is, the quantity of light received by the light receiver 20 is greater when one tapered surface is provided in the light-focusing portion 200 than when two tapered surfaces are provided in the light-focusing portion 200.

In the light-receiving distribution of the lens barrel-equipped lens according to the comparative example as illustrated in FIG. 11, the light-receiving distribution of the light receiver 20 is farther from the center than is the light-receiving distribution of the lens barrel-equipped lens 100 according to the present embodiment as illustrated in FIG. 9B or FIG. 10B. This can generate leak light that is not received. If attempts are made to suppress the leak light that is not received by the light receiver 20 in the lens barrel-equipped lens according to the comparative example, there is a need to use the light receiver 20 having a large light-receiving area, causing an increase in size of the light source device. Also, if the light receiver 20 having a large light-receiving area is attempted to be used, it is expected that it would be unable to be disposed because it would come too close to the light source 10.

The lens barrel-equipped lens 100 according to the present embodiment can efficiently focus the light that was reflected by the half mirror 130 and re-transmitted through the lens 110, and cause that light to be received by the light receiver 20. Thus, the light receiver 20 can be smaller than in the comparative example. Thus, attempts can be made to reduce the size of the light source device 1. Also, because the light can be received near the center on the light-receiving surface of the light receiver 20, it is possible to increase the quantity of received light and also suppress variation in the quantity of received light due to displacement of the light receiver 20. This can increase a margin in production.

As described above, according to the present embodiment, it is possible to provide the lens barrel-equipped lens 100 and the light source device 1 that can increase the quantity of light received by the light receiver 20 in the configuration in which a part of light emitted from the light source 10 is reflected by the half mirror 130 and received by the light receiver 20.

Although the present embodiments have been described above, the present disclosure should not be construed as being limited to these embodiments. For example, the light-focusing portion 200 provided outward of the effective range of the lens 110 may have a configuration in which the light reflected by the half mirror 130 and re-transmitting through the lens 110 is refracted in a direction closer to the optical axis O of the lens 110. That is, the light-focusing portion 200 may have any configuration as long as the light re-transmitting through the lens 110 can be efficiently focused toward the light receiver 20. Also, although the present embodiment illustrates the examples in which two tapered surfaces or two recessed surfaces are provided in the first refraction portion 210 in the light-focusing portion 200, three or more tapered surfaces or three or more recessed surfaces (three or more surfaces selected from the group consisting of the tapered surface and the recessed surface) may be disposed side by side in the direction away from the optical axis O of the lens 110.

According to the present disclosure, it is possible to provide the lens barrel-equipped lens and the light source device that can increase the quantity of light received by the light-receiving element in the configuration in which a part of light emitted from the light source is reflected by the half mirror and received by the light-receiving element.

As long as the gist of the present disclosure is included, the scope of the present disclosure also encompasses embodiments obtained by persons skilled in the art by appropriately making addition, deletion, and design change of the components with respect to each of the above-described embodiments, and embodiments obtained by persons skilled in the art by appropriately combining the features of the configuration example of each of the above-described embodiments.

What is claimed is:

1. A lens structure, comprising:
a lens defining an optical axis, and having opposed first and second lens surfaces, the first lens surface including a first portion and a second portion provided outside the first portion;
a lens barrel configured to retain the lens; and
a half mirror attached to the lens barrel and disposed to face the lens so that a portion of light passing through the lens is reflected back towards the lens,
wherein
the first portion of the lens is configured to receive light from a light source, and the second portion is a light-focusing portion configured to focus light that is reflected by the half mirror and retransmitted through the lens, in a direction at an angle to the optical axis of the lens.

2. The lens structure according to claim 1, wherein the light-focusing portion includes
a first refraction portion configured to refract the light reflected by the half mirror and retransmitted through the lens in a direction away from the optical axis of the lens, and
the first refraction portion includes a tapered surface or a recessed surface.

3. The lens structure according to claim 2, wherein the first refraction portion includes
two or more surfaces selected from the group consisting of the tapered surface and the recessed surface, and
the two or more surfaces are disposed side by side in the direction away from the optical axis of the lens.

4. The lens structure according to claim 2, wherein the first refraction portion includes
a plurality of tapered surfaces disposed side by side in the direction away from the optical axis of the lens, each of the plurality of tapered surfaces being the tapered surface, and
the tapered surfaces that are closer to the optical axis have a greater angle with respect to an axis orthogonal to the optical axis.

5. The lens structure according to claim 2, wherein the light-focusing portion further includes a second refraction portion configured to refract the light reflected by the half mirror, the second refracting portion provided in a region of the second lens surface outward of portion of the second lens surface configured to transmit light from the light source.

6. The lens structure according to claim 5, wherein as viewed in a direction along the optical axis, the second refraction portion overlaps at least a part of the first refraction portion.

7. A light source device, comprising:
a light source;
a light receiver provided proximate the light source; and
the lens structure of claim 1, wherein
the light emitted from the light source is divided into
light that transmits through the half mirror of the lens structure, and
light that is reflected by the half mirror, and
the light reflected by the half mirror re-transmits through the lens and is focused by the light-focusing portion toward the light receiver.

8. The light source device according to claim 7, wherein the light traveling from the light-focusing portion toward the light receiver includes a focal point located between the light-focusing portion and the light receiver.

* * * * *